(12) United States Patent
Myoren et al.

(10) Patent No.: US 9,217,368 B2
(45) Date of Patent: Dec. 22, 2015

(54) GAS TURBINE, EXHAUST DIFFUSER, AND METHOD OF MODIFYING GAS TURBINE PLANT

(75) Inventors: Chihiro Myoren, Tokai (JP); Ryo Akiyama, Hitachinaka (JP); Shinya Marushima, Hitachinaka (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 1173 days.

(21) Appl. No.: 12/981,992

(22) Filed: Dec. 30, 2010

(65) Prior Publication Data
US 2011/0162369 A1    Jul. 7, 2011

(30) Foreign Application Priority Data
Jan. 7, 2010    (JP) .................................. 2010-001704

(51) Int. Cl.
*F01D 25/30* (2006.01)
*F01D 1/02* (2006.01)
*F02C 6/18* (2006.01)
*F02C 3/10* (2006.01)
*F22B 1/18* (2006.01)

(52) U.S. Cl.
CPC ... *F02C 6/18* (2013.01); *F01D 1/02* (2013.01); *F01D 25/30* (2013.01); *F02C 3/10* (2013.01); *F22B 1/1815* (2013.01);
(Continued)

(58) Field of Classification Search
CPC ............ F01D 25/30; F01D 1/02; F01D 9/02; F01D 9/04; F01D 9/045; F01D 9/047; F01D 9/048; F02C 6/18; F02C 3/10; F05D 2220/72; F05D 2240/12; Y02E 20/16; F04D 29/44
USPC ......... 60/685, 694, 39.5, 796, 805; 415/211.2
See application file for complete search history.

(56) References Cited

U.S. PATENT DOCUMENTS

| 4,315,715 A | * | 2/1982 | Nishiguchi et al. | ........... 415/207 |
| 5,203,674 A | * | 4/1993 | Vinciguerra | ............... 415/211.2 |

(Continued)

FOREIGN PATENT DOCUMENTS

| JP | 2004-162715 A | 6/2004 |
| JP | 2005-256607 A | 9/2005 |

(Continued)

OTHER PUBLICATIONS

Japanese Office Action dated May 8, 2012 with English translation (seven (7) pages).

*Primary Examiner* — Phutthiwat Wongwian
*Assistant Examiner* — Alain Chau
(74) *Attorney, Agent, or Firm* — Crowell & Moring LLP

(57) ABSTRACT

A method of modifying a gas turbine plant which is provided with a one-shaft gas turbine having a compressor for compressing air, a combustor for generating a combustion gas from the air compressed by the compressor and a fuel, and a one-shaft turbine driven by the combustion gas generated by the combustor and supported by a rotational axis common to the compressor, and an electric generator for generating electric power by driving force of the one-shaft turbine, wherein: the one-shaft turbine is replaced with a two-shaft gas turbine including a compressor for compressing air, a combustor for generating a combustion gas from the air compressed by the compressor and a fuel, and a high-pressure turbine driven by the combustion gas generated by the combustor and supported by a first rotational axis common to the compressor, and a low-pressure turbine driven by the combustion gas used to drive the high-pressure turbine and supported by a second rotational axis, which is different from the axis for the high-pressure turbine.

3 Claims, 9 Drawing Sheets

(52) U.S. Cl.
CPC ........ *F05D 2220/72* (2013.01); *F05D 2240/12* (2013.01); *Y02E 20/16* (2013.01); *Y10T 29/4932* (2015.01)

(56) References Cited

U.S. PATENT DOCUMENTS

| | | | |
|---|---|---|---|
| 5,603,604 A | * | 2/1997 | Norris et al. ................ 415/208.1 |
| 6,231,304 B1 | * | 5/2001 | Andersson ................ 415/211.2 |
| 6,533,546 B2 | * | 3/2003 | Kreitmeier ................ 415/211.2 |
| 2004/0091350 A1 | | 5/2004 | Graziosi et al. |
| 2010/0269480 A1 | * | 10/2010 | Lindenfeld .................... 60/39.5 |
| 2010/0293963 A1 | | 11/2010 | Myoren et al. |

FOREIGN PATENT DOCUMENTS

| | | |
|---|---|---|
| JP | 2005-290985 A | 10/2005 |
| JP | 2008-157110 A | 7/2008 |
| JP | 2011-1950 A | 1/2011 |

\* cited by examiner

GAS TURBINE, EXHAUST DIFFUSER, AND METHOD OF MODIFYING GAS TURBINE PLANT

CLAIM OF PRIORITY

The present application claims priority from Japanese patent application JP 2010-001704 filed on Jan. 7, 2010, the content of which is hereby incorporated by reference into this application.

BACKGROUND OF THE INVENTION

1. Field of the Invention

The present invention relates to gas turbine, exhaust diffuser, and a method of modifying gas turbine plant.

2. Description of Related Art

Due to the recent high interest in environmental problems, more improved performance has been requested for thermal power generation facilities. In this situation, gas turbines have been expected to play a role of reducing $CO_2$ because the efficiency of a gas turbine alone is relatively high and because, when combined with another power generation facility, the gas turbine can achieve a high power generation efficiency of 50% or more. An example of this is a combined cycle in which a gas turbine is combined with a steam turbine. For this reason, not only when a new gas turbine is installed, but also when an existing gas turbine is updated, it is desired that a more efficient plant will be constructed. In addition, improved performance is requested not only the main components such as compressors, combustors, and turbines but also for sections such as inlet parts and exhaust parts.

Not much literature related to technologies for updating an existing gas turbine plant has been disclosed. In addition, although some methods of reducing a loss at an exhaust part have been studied, the target is often a flow path shape or strut. In the Patent Document 1, for example, to suppress separation by a diffuser, a jet is ejected so as to trace a casing on an outer circumference side and its ejection method is adjusted. In addition, in the Patent Documents 2 and 3, the shape and position of a strut are adjusted to reduce the loss caused at the strut.

Patent Document 1: Japanese Patent Laid-open No. 2004-162715
Patent Document 2: Japanese Patent Laid-open No. 2008-157110
Patent Document 3: Japanese Patent Laid-open No. 2005-290985

SUMMARY OF THE INVENTION

When an existing gas turbine plant is updated, there are often many restrictions on outputs, spaces, and the like. It is not easy to provide a highly efficient gas turbine plant with these restrictions observed. Sometimes, the electric generator and auxiliary machines are not updated. Furthermore, in the loss reduction methods described above, losses at the turn vanes of the exhaust diffuser and the supporting members are not considered. The technologies disclosed in the Patent Documents 1 and 2 are disadvantageous in terms of spaces and costs because a new structure needs to be added to improve performance.

An object of the present invention is to provide a gas turbine, an exhaust diffuser, and a method of modifying gas turbine plant that is highly efficient even in the case of updating an existing gas turbine plant.

A method of modifying a gas turbine plant of the present invention, which is provided with a one-shaft gas turbine having a compressor for compressing air, a combustor for generating a combustion gas from the air compressed by the compressor and a fuel, and a one-shaft turbine driven by the combustion gas generated by the combustor and supported by a rotational axis common to the compressor, and an electric generator for generating electric power by driving force of the one-shaft turbine, wherein: the one-shaft turbine is replaced with a two-shaft gas turbine including a compressor for compressing air, a combustor for generating a combustion gas from the air compressed by the compressor and a fuel, and a high-pressure turbine driven by the combustion gas generated by the combustor and supported by a first rotational axis common to the compressor, and a low-pressure turbine driven by the combustion gas used to drive the high-pressure turbine and supported by a second rotational axis, which is different from the axis for the high-pressure turbine.

A gas turbine of the present invention, which is provided with a compressor for compressing air, a combustor for generating a combustion gas from the air compressed by the compressor and a fuel, a turbine driven by the combustion gas generated by the combustor, an exhaust diffuser which is a flow path of the combustion gas driven the turbine, an exhaust duct from which the combustion gas is externally expelled, an exhaust chamber in which the exhaust diffuser and the exhaust duct are mutually connected, a turn vane provided in the exhaust diffuser to change a combustion gas flow, and a support member for supporting the turn vane, wherein: a vertical distance from a center of a rotational axis to a top of the exhaust chamber is longer than a vertical distance from the center of the rotational axis to a bottom of the exhaust chamber; and the support member is shaped so as to suppress interference on a fluid flow in a circumferential direction of the rotational axis.

An exhaust diffuser of the present invention, which is provided with a turn vane for redirecting a fluid flow and a support member for supporting the turn vane, wherein: the support member is shaped so as to suppress interference on the fluid flow in a width direction of the turn vane.

According to the present invention, a gas turbine, an exhaust diffuser, and a method of modifying gas turbine plant that is highly efficient even in the case of updating an existing gas turbine plant can be provided.

DETAILED DESCRIPTION OF THE PREFERRED EMBODIMENTS

Figure 1:
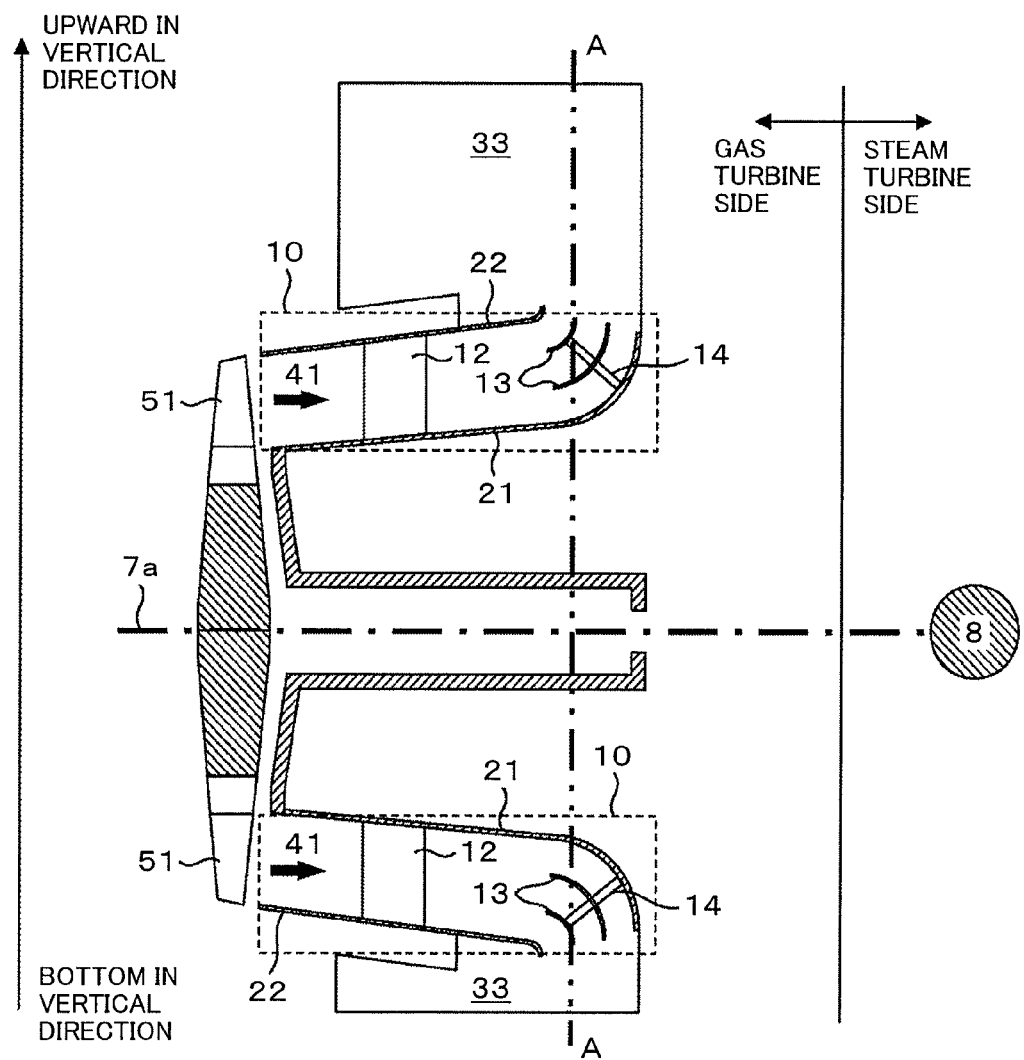
FIG. 1 is a meridional-plane cross sectional view of an exhaust diffuser and exhaust chamber related to a first embodiment of the present invention.

In general, the output from an electric power generation plant is limited to an approved output. When, in an existing plant, a new gas turbine is substituted for an existing gas turbine in the same output band, an output more than the approved output may be generated. This is because the efficiency of new gas turbine tends to be higher than the efficiency of existing gas turbine due to the progress of technology. Another situation is that a customer requires a higher efficiency facility when a plant is updated.

When the output is constant, the load of the bucket is reduced by increasing the diameter of the flow path, enabling the turbine efficiency to be improved. With a one-shaft gas turbine, however, as the flow path diameter of the turbine increases, the axial length generally tends to increase as well. Accordingly, the performance is hard to improve with the axial length left unchanged.

By contrast, in view of output improvement due to high gas turbine efficiency, the use of a scale-down gas turbine is also conceivable. However, when an electric generator is diverted and a scale-down high-performance gas turbine is operated at high rotational speed, a decelerator needs to be provided between the gas turbine and the electric generator. This is because the gas turbine needs to operate at a rotational speed that meets the requirements of the electric generator. When the decelerator is used, the efficiency of the gas turbine plant is reduced due to a decelerator loss. In addition, when the gas turbine is updated, there is often a spatial restriction, so addition of the decelerator is often difficult. When an attempt is made to also divert existing facilities other than the electric generator, the spatial restriction is further enlarged.

In view of the background described above, the inventors reached a finding that when an existing one-shaft gas turbine is updated, the use of a two-shaft gas turbine can solve the above problems. When a two-shaft gas turbine is used, if the rotational speeds of the compressor and high-pressure turbine are higher than the rotational speed of the low-pressure turbine, the entire axial length can be reduced while the effect of an increase in the fluid path diameter is obtained. An operation at high rotational speed is also possible by using scale-down design only on a gas generator side including the compressor and high-pressure turbine. As a result, the flow rate of compressor inlet can be reduced and thereby the output can be reduced to or below the approved output. In addition, on a power turbine side including the low-pressure turbine, it is possible to perform an operation at a rotational speed that observes the electric generator restrictions. Then, the use of a decelerator can be eliminated and the spatial restriction can also be solved without reducing the efficiency of the gas turbine plant.

Furthermore, the rotational speed on the gas generator side is free from the restrictions imposed on the electric generator. Accordingly, any rotational speed can also be selected so that the efficiency optimal for the compressor is obtained, and thereby the efficiency of the gas turbine can be further increased. Improvement in the gas turbine efficiency also results in reduction in the amount of fuel consumption and $CO_2$.

Next, items to be studied in modification of a one-shaft gas turbine to a two-shaft gas turbine will be described.

In a process of studying the modification of a one-shaft gas turbine to a two-shaft gas turbine in various aspects, an idea was derived among inventors that when the axis height of the gas turbine and the axial length match those of an existing one-shaft turbine, an existing electric generator, an existing exhaust duct, and the like can be used. In the case of a combined plant, an existing steam turbine can also be used. If existing facilities can be used, not only the manufacturing of new facilities is unnecessary, but also burdens in design, test, and the like can be substantially reduced. Accordingly, significant merits are obtained in terms of costs, delivery times, and reliability. When the axis height and the axial length match those of an existing one-shaft turbine, the spatial restriction can also be observed as a result.

Embodiments described later relate to a modification method based on an existing plant that has a one-shaft gas turbine including a compressor for compressing air, a combustor for generating a combustion gas from the air compressed by the compressor and a fuel, and a turbine that is driven by the combustion gas generated by the combustor and is supported by a rotational axis common to the compressor, and also has an electric generator for generating electric power by means of the driving force of the one-shaft gas turbine. When this one-shaft gas turbine is replaced with a two-shaft gas turbine that has a two-shaft gas turbine including a compressor for compressing air, a combustor for generating a combustion gas from the air compressed by the compressor and a fuel, and a high-pressure turbine that is driven by the combustion gas generated by the combustor and is supported by a first rotational axis common to the compressor, and a low-pressure turbine that is driven by the combustion gas used to drive the high-pressure turbine and is supported by a second rotational axis, which is different from the axis for the high-pressure turbine, various effects can be obtained.

When the one-shaft gas turbine is replaced with the two-shaft gas turbine, the efficiency of the plant can be increased without having to prolong the axial length. In addition, since a decelerator is not necessary, a highly efficient gas turbine plant still with a desired output value can be provided. Moreover, if the height of the first rotational axis of the two-shaft gas turbine on the gas generator side and the height of the second rotational axis on the power turbine side are made same as the height of the rotational axis of the one-shaft gas turbine before the modification, the axial height of the gas turbine before the modification will be the same as the axial heights of the gas turbines after the modification. Then, the electric generator and other devices that are connected with the same axis can be diverted, enabling a gas turbine plant to be provided at a low cost. In addition, if the axial length of the two-shaft gas turbine is made the same as the axial length of the one-shaft gas turbine before the modification, a new two-shaft gas turbine can be installed in the same space as the existing one-shaft gas turbine, overcoming the spatial restriction to be observed. The gas turbine base, the suction duct, the exhaust duct, and other components of the existing gas turbine can also be used without significant design changes.

Next, an example that can observe a spatial restriction will be described, focusing on the exhaust part of the turbine. Unless otherwise noted, the inner circumference side, outer circumference side, circumferential direction, and radial direction in the description below respectively refer to the inner circumference side, outer circumference side, circumferential direction, and radial direction of a circle centered around the rotational axis of a gas turbine.

At the exhaust part of the turbine, it is important to exhaust a working fluid with a low loss after the turbine has been driven. With the exhaust diffuser, which mutually connects the bucket at the last stage of the turbine and the exhaust chamber, in particular, the kinetic energy of a high-speed gas that has passed through the turbine is converted into pressure energy, so the cross section of the flow path (gas path) is an expanded flow path with an increased cross section. That is, in the diffuser, the static pressure is increased and the flow speed is lowered, so the flow is likely to be separated near the wall surface of the flow path. In addition, to reduce the axial space, the flow is redirected from the axial direction to the vertical direction by the exhaust diffuser. In this case, since the flow passes through the wall surface having a curvature, separation is further likely to occur. This problem becomes more serious when there is a spatial restriction as in a case in which a one-shaft gas turbine is modified to a two-shaft gas turbine. When separation occurs, a large pressure loss is caused. To increase the efficiency of the exhaust part, therefore, it is desirable to suppress separation at the exhaust diffuser.

Figure 5:
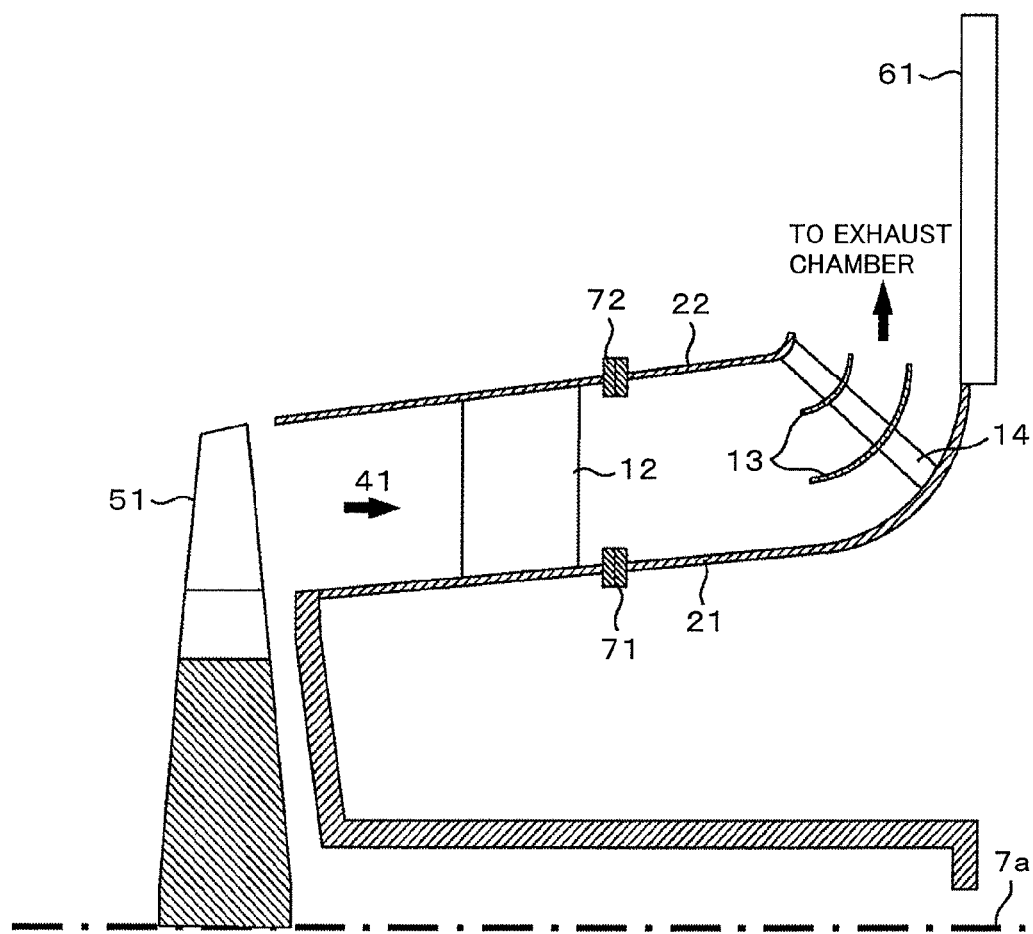
FIG. 5 is a schematic meridional-plane cross sectional view of a general exhaust diffuser.

FIG. 5 is a schematic meridional-plane cross sectional view of an exhaust diffuser used as a comparative example. The diffuser is shaped as a lateral type, which redirects the flow from the axial direction to the vertical direction. In FIG. 5, the flow path of the working fluid is a portion between an inner circumferential casing 21 and an outer circumferential casing 22. When an exhaust gas 41, which has passed through a turbine bucket 51, passes through a plurality of turn vanes 13 provided in the flow path, the gas changes its flow direction to the vertical direction and enters an exhaust chamber (not shown). In addition, to support the outer circumferential casing 22 and turn vanes 13, struts 12 and support members 14 are provided in the flow path.

It can be considered that when the exhaust diffuser loss reduction methods disclosed in Patent Documents 1 to 3 are used, a loss to the struts 12 in FIG. 5 is somewhat reduced. In these loss reduction methods, however, the losses at the turn vanes 13 and support members 14 in FIG. 5 are not considered. If separation occurs in these sections, it is highly likely that the entire loss of the exhaust diffuser is not adequately reduced. That is, a method of reducing losses at the turn vanes 13 and support members 14 is also desired. In addition, with the technologies disclosed in Patent Documents 1 and 2, a new structure needs to be added to improve performance, so costs will be increased. Furthermore, when there is a spatial restriction on, for example, modification of an existing gas turbine, there is a problem in that a countermeasure that a new structure is added is not preferable.

Places at which separation is most likely to occur near the turn vanes 13 and support members 14 in FIG. 5 are the curved section of the outer circumferential casing 22 and the support member 14. The curved section of the outer circumferential casing 22 is the outermost circumference of the curved sections, so it has a small curvature radius. Accordingly, the flow cannot be redirected completely and thereby separation is likely to occur. Furthermore, if the support members 14 are present in this flow path, separation is more likely to occur due to a boundary layer developed at a section at which the curved section on the outer circumferential side and the support members 14 are mutually connected.

On the other hand, a large separated area is likely to be generated near the support member 14 if the flow has a turn angle as in a part-load operation and the support member 14 has a flat plate shape or the like, because the support member 14 stops the flow. In particular, if there is a restriction on the axis height of the gas turbine, the effect of this type of separation may become large. This is because, if the distance from the bottom of the exhaust chamber in the vertical direction to the outlet of the exhaust diffuser is shorter than the distance from the top in the vertical direction to the outlet of the exhaust diffuser, there is not enough space to rectify the flow separated by the support member 14, in which case a large slack area may be generated at the bottom in the vertical direction and thereby performance may be largely lowered. Incidentally, if the flow does not have a turn angle in the rotational direction, the problem is not serious. When an actual gas turbine is designed, the spatial restriction is prioritized in consideration, and the performance of the exhaust chamber in a part-load operation is not so often prioritized in consideration. Accordingly, it cannot be easily assumed that the flow has a turn angle in the rotational direction at the exhaust part. In addition, the support member 14 is required to have a structure and thickness that assure a strong strength.

In contrast, the inventors repeatedly studied structures that can suppress losses even when the flow has a turn angle in the rotational direction, in the process of designing a two-shaft gas turbine that can be installed in a limited space. The fact that a two-shaft gas turbine is often used in a part-load operation is one reason why the inventors focused on this study. The finding that places at which separation is most likely to occur near the turn vanes 13 and support members 14 are the curved section of the outer circumferential casing 22 and the support member 14 was derived from this study.

According to each embodiment described below, some exhaust diffusers support a range from the inner circumferential wall to an intermediate turn vane toward the outer circumference side in the direction of the radius of the turbine. In this arrangement, there is no support member at the curved section on the outer circumferential side, at which separation is likely to occur, so separation of the flow at this place can be suppressed. In addition, when the support member has a bar-like shape, separation in the flow field having a turn angle, which would occur when flat plate-like support members are used, can be suppressed. In this case, when the diameter of the support member is reduced from the inner circumferential side to the outer circumferential side, a range over which the turn vane on the outer circumferential side, which has a relatively small curvature radius, and the support members are mutually connected can be reduced, so separation can be further suppressed. In addition, when a plurality of support members are provided in the flow direction and their diameters are smaller than when a single support member supports the turn vanes, the loss caused downstream of the support members can be reduced.

In addition, when the exhaust diffuser of the present invention is used for a gas turbine facility in which the distance from the bottom of the exhaust chamber in the vertical direction to the outlet of the exhaust diffuser is shorter than the distance from the top of the exhaust chamber in the vertical direction to the outlet of the exhaust diffuser, separation by the support members is suppressed. Accordingly, a slack area, which is generated when the flow is stopped near the bottom of the exhaust chamber in the vertical direction, can be suppressed and thereby the loss can be reduced.

In addition, when the structure of the exhaust diffuser and exhaust chamber in each embodiment is used in the method of modifying an existing gas turbine, the loss at the exhaust diffuser part can be reduced with a simple structure.

So far, each embodiment has been described as an example that can observe a spatial restriction. However, each embodiment is also effective for an object of providing a gas turbine that can suppress the loss at the exhaust part to a low level with a simple structure. In the loss reduction methods described in Patent Documents 1 to 3, the losses at the turn vanes and support members in the exhaust diffuser are not considered. In addition, with the technologies disclosed in Patent Documents 1 and 2, a new structure needs to be added to improve performance. Therefore, each embodiment is also advantageous in terms of space and cost.

Embodiments of the present invention will be described with reference to the drawings.

Embodiment 1

Figure 2:
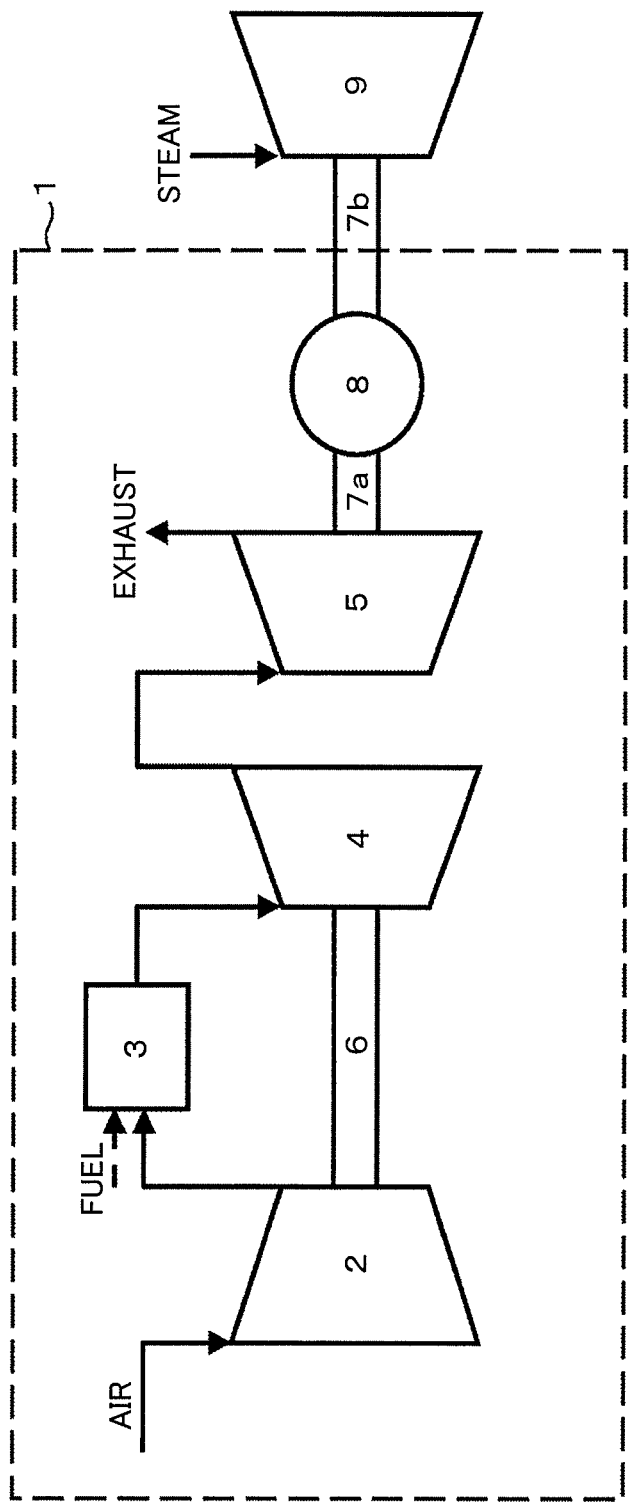
FIG. 2 is a cyclic structural diagram of a gas turbine related to the first embodiment of the present invention.

FIG. 2 is a cyclic structural diagram of a gas turbine in a first embodiment of the present invention. This embodiment assumes that a combined plant that uses an existing one-shaft gas turbine is modified to a two-shaft gas turbine. As an example of this modification, FIG. 2 shows the structure of a combined cycle using a two-shaft gas turbine. That is, the cycle a gas turbine is as outlined below.

At first, air, which is a working fluid, enters an axial flow compressor 2 and is compressed, after which the compressed air enters a combustor 3. A fuel is added into the combustor 3, and a high-temperature combustion gas is generated. This high-temperature, high-pressure gas enters a high-pressure turbine 4, which is connected to the compressor 2 via a first rotational axis 6, and drives the compressor 2, after which the gas enters a low-pressure turbine 5. When the working fluid passes through the low-pressure turbine 5, an electric generator 8 connected via a second rotational axis 7a is driven, generating electric power. An exhaust gas 41, which has passed through the low-pressure turbine 5, enters an exhaust diffuser (described later), after which heat is recovered by an exhaust heat recovery boiler (not shown) and then the exhaust gas is finally released to the air. The exhaust heat recovery boiler uses steam to recover heat from the exhaust gas, and uses this steam to drive a steam turbine 9. The steam turbine 9 is also connected to the electric generator 8 via a second rotational axis 7b. The rotational speeds of the high-pressure turbine 4, low-pressure turbine 5, and steam turbine 9 are respectively assumed to be about 4500 rpm, about 3600 rpm, and about 3600 rpm.

Figure 3:
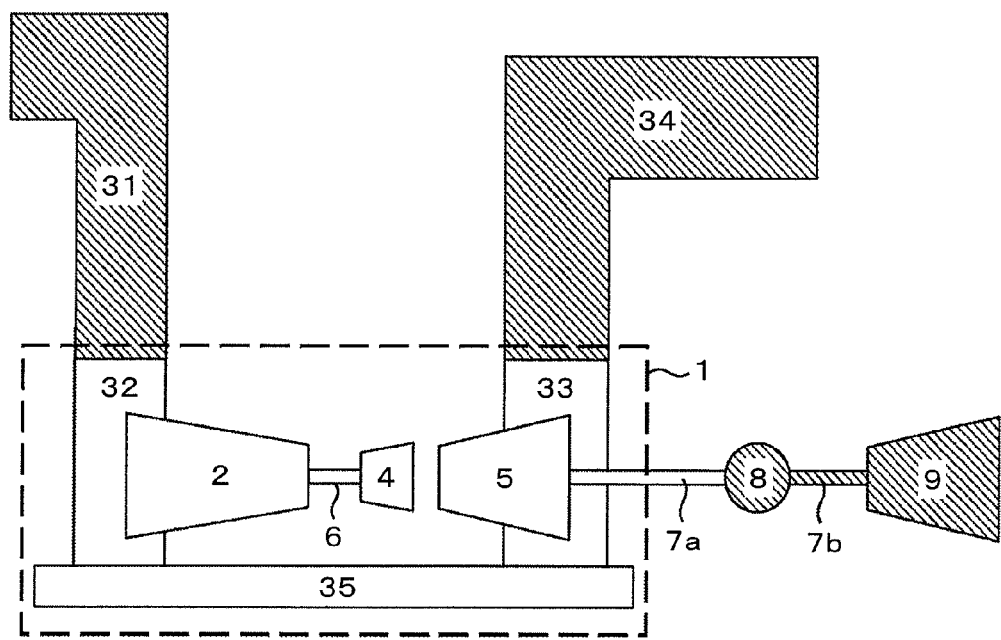
FIG. 3 is a device layout diagram related to the first embodiment of the present invention.

In addition, FIG. 3 shows a schematic device layout in this embodiment of the present invention. In FIG. 3, existing devices diverted without modification are indicated by hatching. This embodiment assumes that the gas turbine 1 is replaced. Targets to be replaced are the compressor 2, combustor 3, high-pressure turbine 4, low-pressure turbine 5, rotational axes 6 and 7a, inlet chamber 32, exhaust chamber 33, and gas turbine base 35. For the inlet duct 31, exhaust duct 34, electric generator 8, and steam turbine 9, existing devices are diverted. Since the electric generator 8 and steam turbine 9 are diverted, the heights of the rotational axes 6 and 7a in the vertical direction remain unchanged. Since the inlet duct 31 and exhaust duct 34 are also diverted, the entire axial length of the gas turbine 1 also remains unchanged. As a result, the space in which to install the gas turbine 1 is not largely changed.

A modified gas turbine is required to be more efficient than the gas turbine before modification. When the rotational speed remains unchanged, the simplest method of improving the efficiency of a turbine is to increase the diameter of the flow path through which the working fluid flows. The turbine obtains output by having the working fluid turn the buckets. The output is proportional to the product of the load of the buckets and the rotational speed of the buckets. When the output is constant, the load of the buckets is reduced by increasing the diameter of the flow path, enabling the turbine efficiency to be improved. With a one-shaft gas turbine, however, as the flow path diameter of the turbine increases, the axial length generally tends to increase as well. Accordingly, the performance is hard to improve with the axial length left unchanged, as in this embodiment. With a two-shaft gas turbine, however, when the rotational speeds of the compressor 2 and high-pressure turbine 4 are made higher than the rotational speed of the low-pressure turbine 5, the entire axial length can be reduced while the effect due to an increase in the fluid path diameter is obtained. Then, the efficiency can be improved while the entire axial length is left unchanged. When the heights of the rotational axes 6 and 7a in the vertical direction remain unchanged as in this embodiment, however, the diameter of the low-pressure turbine 5 becomes large and thereby the flow in the exhaust chamber 33 is disturbed. This may lower efficiency in the exhaust chamber 33.

FIG. 1 is a meridional-plane cross sectional view of the exhaust diffuser and exhaust chamber in this embodiment. FIG. 1 details the outlet of the exhaust chamber 33 and the outlet of the low-pressure turbine 5 in FIG. 3. The structure of the exhaust diffuser 10 in FIG. 1 will be described first.

As in the comparative example in FIG. 5, the diffuser 10 is shaped as a lateral type, which redirects the flow from the axial direction to the vertical direction. Its flow path is formed of the inner circumferential casing 21 and outer circumferential casing 22. The turn vanes 13 are disposed in the flow path to efficiently redirect the flow. The turn vanes 13 are supported by the support members 14. The shape of the support member 14 is assumed to be a bar-like (columnar) having a circular cross section. In this embodiment, the cross section of the support member 14 is a plane perpendicular to the height direction of the support member 14. The outer circumferential casing 22 is supported by a plurality of struts 12 disposed in the circumferential direction of the flow path. Although the number of turn vanes 13 in the radial direction is two in this embodiment, if there is no problem of, for example, causing separation, more than two turn vanes or less than two turn vanes may be used without a problem.

Figure 4:
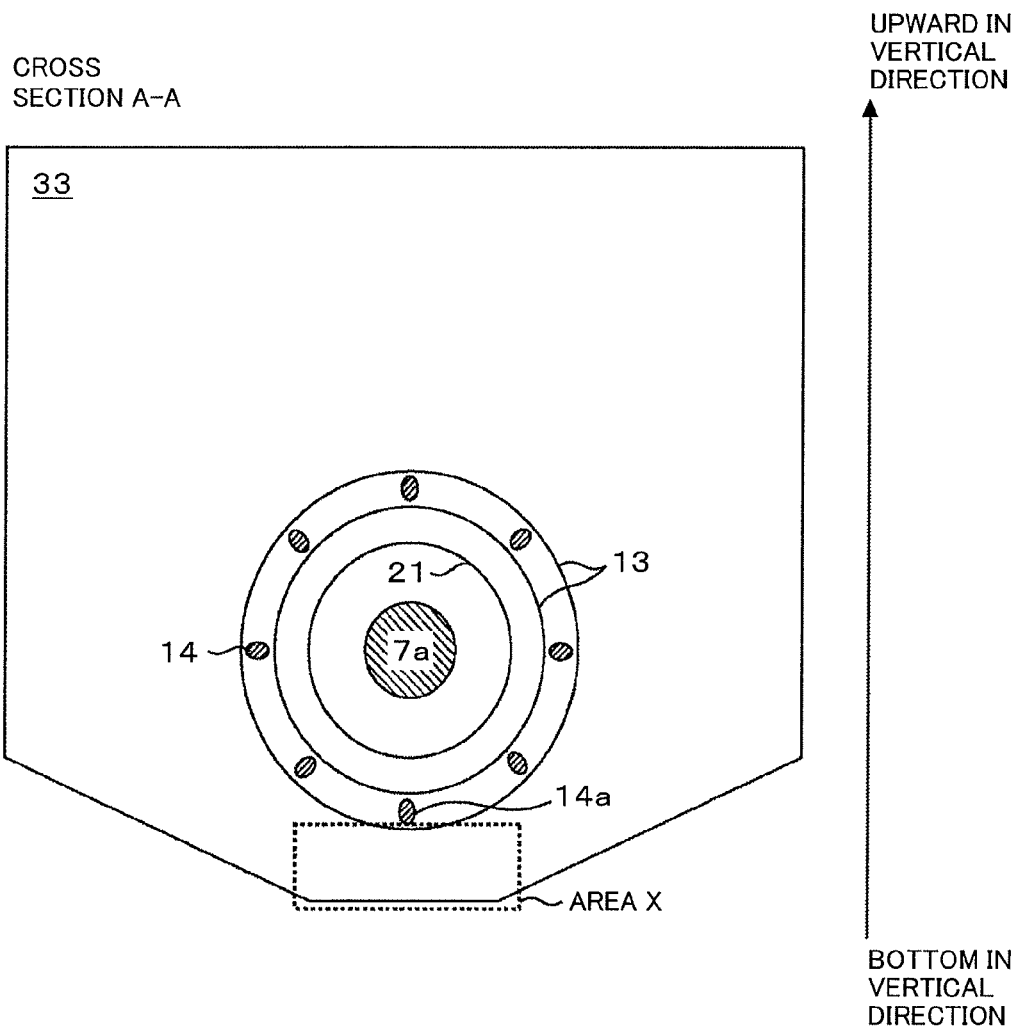
FIG. 4 is an axial cross sectional view of the exhaust diffuser and exhaust chamber related to the first embodiment of the present invention
Figure 6:
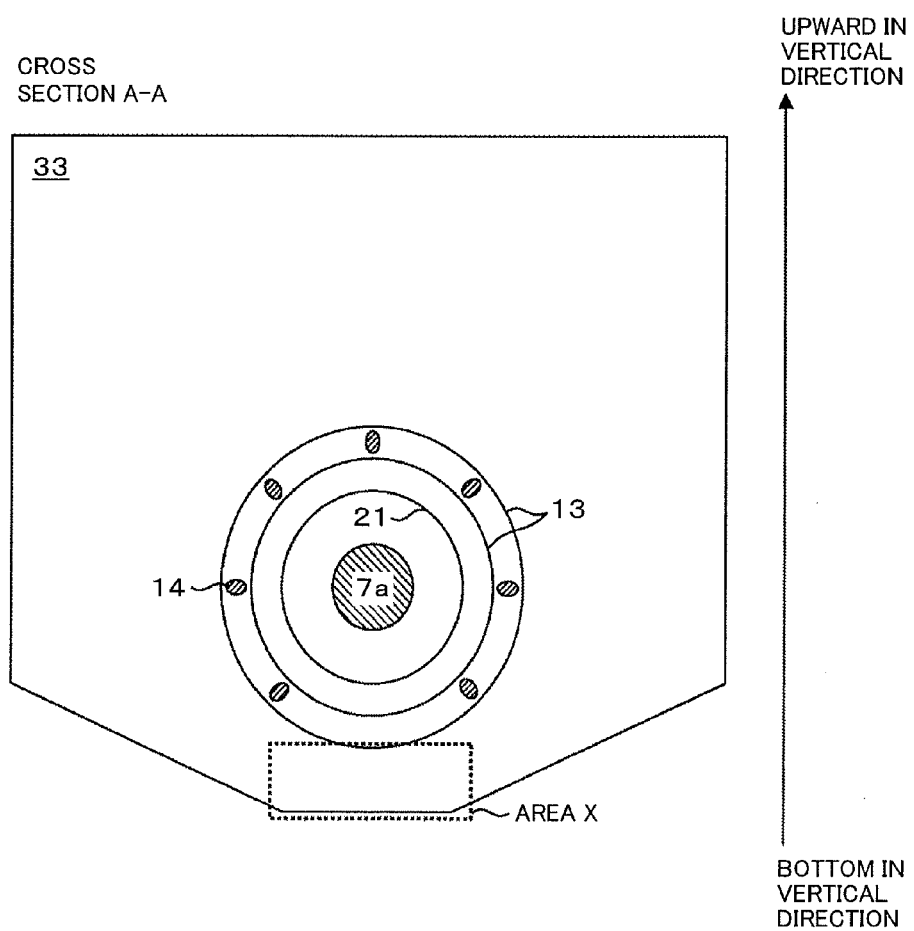
FIG. 6 is an axial cross sectional view of the exhaust diffuser and exhaust chamber related to a variation of the first embodiment of the present invention.
Figure 7:
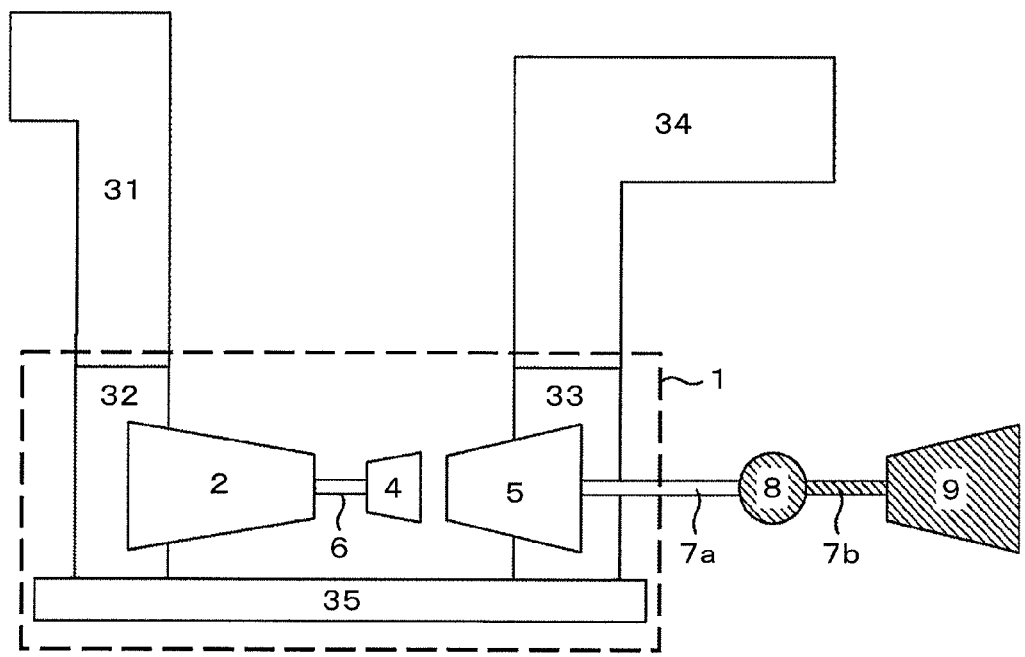
FIG. 7 is a device layout diagram related to a variation of the first embodiment of the present invention.

Next, the structure on the same side as the exhaust chamber 33 will be described by using FIGS. 1 and 4. FIG. 4 is a cross sectional view showing section A-A in FIG. 1. In FIGS. 1 and 4, differing from the exhaust diffuser 10, the exhaust chamber 33 is not vertically symmetrical with respect to the rotational axis 7 of the gas turbine. That is, the exhaust chamber 33 is not linearly symmetrical with respect to the rotational axis 7. Specifically, the distance from the bottom of the exhaust chamber 33 to the exhaust diffuser 10 is shorter than the distance from the top of the exhaust chamber 33 to the exhaust diffuser 10. It can also be said that the vertical distance from the rotational axis 7 to the top of the exhaust chamber 33 is longer than the vertical distance from the center of the rotational axis 7 to the bottom of the exhaust chamber 33. This is because, with the two-shaft gas turbine in this embodiment, there is a restriction on the distance from the ground to the axis so that the height from the installation surface to the rotational axis 7 matches the height in the one-shaft gas turbine before modification. In this case, an area at the bottom in the vertical direction (equivalent to the area X in FIG. 4) is closer to the wall surface of the exhaust chamber 33 than other areas, so the flow is likely to be stopped in that area. Incidentally, although, in FIG. 4, the number of support members 14 is eight in the circumferential direction, if there is no problem with strength, more than eight support members or less than eight support members may be used without a problem. Similarly, if there is no problem with strength, a structure in which no support member 14 (14a shown in FIG. 4) is placed at a lower portion in the vertical direction may be used as a variation of this embodiment as shown in FIG. 6. This prevents the flow from stopping easily. That is, when a structure is such that, in the circumferential direction of the rotational axis 7, strength is assured in an upper portion where the flow is not easily separated and interference on the flow is suppressed in the lower portion where the flow is easily separated, the fluid can optimally flow. Specifically, the number of support members 14, which support the turn vanes 13, in the lower portion may be smaller than in the upper portion (there may be no support member 14 immediately below the rotational axis 7a, as shown in FIG. 7), or the support members 14 in the lower portion may be thinner than in the upper portion. Alternatively, the support members 14 in the upper portion may reach the outer circumferential casing 22 and the support members 14 in the lower portion may not reach the outer circumferential casing 22.

As these embodiments indicate, when the support members 14 have different shapes for suppressing interference on the fluid flow in the exhaust diffuser 10 in the circumferential direction, not only fluid loss can be reduced but also strength can be assured. To change shapes in the circumferential direction means to apply the above embodiments and other methods in combination or alone. As a result, the shapes of the support members 14 and their numbers are not linearly axisymmetric with respect to the rotational axis 7.

Now, a specific operation of the exhaust diffuser 10 in this embodiment will be described. In the gas turbine cycle shown in FIG. 2, a pressure ratio of about 17 and a combustion temperature of about 1300° C. are assumed. As the physical quantities of the exhaust gas 41 after it has passed through the bucket 51 at the last stage of the low-pressure turbine 5, a total pressure of about 0.1 MPa and a total temperature of about 500° C. are assumed. Although the flow velocity at the inlet of the exhaust diffuser 10 is about 250 m/s under these conditions, when the working fluid passes through the enlarged flow path formed of the inner circumferential casing 21 and outer circumferential casing 22, the flow velocity is lowered; the working fluid enters the exhaust chamber 33 at a speed of about 100 m/s. After entering the exhaust chamber 33, the working fluid is rectified in its interior and is finally released to the air.

In the exhaust diffuser 10 in this embodiment, the support members 14 only support turn vanes 13 up to an intermediate point, from the inner circumferential wall to the outer circumference in the radial direction of the turbine, and are not connected to the outer circumferential casing 22. When the flow is redirected, a place at which separation is most likely to occur is the curved section of the outer circumferential casing 22. In this embodiment, since no additional boundary layer develops, which would be caused by interference between the flow that passes through the curved section and the support members 14, separation is suppressed. Furthermore, since there is no obstacle in the flow path formed of the outer circumferential casing 22 and the turn vane 13 nearest to the outer circumferential side, the loss is reduced accordingly.

In addition, in the exhaust diffuser 10 in this embodiment, if the exhaust gas 41 has a turn angle, the flow is also expected to have almost the same turn angle with respect to the support members 14. In this case as well, due to a bar-like shape (columnar) of the support members 14, they don't function as a serious blockage against the flow with different turn angles, so an increase in loss can be suppressed. Since the exhaust gas 41 has a turn angle mainly during a part-load operation, operability can be increased by suppressing a reduction in performance.

In particular, as in this embodiment, when the distance from the bottom of the exhaust chamber in the vertical direction to the outlet of the exhaust diffuser is shorter than the distance from the top of the exhaust chamber in the vertical direction to the outlet of the exhaust diffuser, that is, when the length of the area X in FIG. 4 in the vertical direction is short, the effect becomes significant. Specifically, as described above, when the support members 14 function as a blockage against the flow and a separated area is generated, the separated flow is likely to be rectified in other than the area X in the exhaust chamber 33. This is because the distance to the wall surface is sufficient. In the area X, however, the distance to the wall surface is insufficient and that portion becomes a stagnation area, in which the flow is stopped. Due to generation of this stagnation area, the loss in the range from the exhaust diffuser 10 to the exhaust chamber 33 largely increases. In this embodiment, the flow at the support members 14 is not easily separated and thereby the generation of the stagnation area described above can be suppressed, so reduction in performance can be suppressed particularly during a part-load operation. Furthermore, when the support members 14 are disposed in the circumferential direction, if they are not disposed at the bottom in the vertical direction as shown in FIG. 7, the possibility of the generation of a slack area in the area X is further reduced.

FIG. 7 shows a schematic device layout diagram as a variation of this embodiment when the inlet duct 31 and exhaust duct 34 are also modified. In the variation shown in FIG. 7, the heights of the rotational axes 6 and 7a in the vertical direction cannot be changed, but the length in the axial direction can be changed. Accordingly, modification becomes possible by increasing the entire diameter of the gas turbine. That is, when modification conditions are as shown in FIG. 7, the above idea can be applied not only to the two-shaft gas turbine indicated in this embodiment but also to a one-shaft gas turbine by which the driving of the compressor and the driving of the output axis are performed by the same turbine.

This embodiment described so far is to modify a plant using a one-shaft gas turbine to a plant using a two-shaft gas turbine. This type of two-shaft gas turbine includes the exhaust diffuser 10, which is a flow path of a combustion gas that has driven the low-pressure turbine 5, the turn vanes 13 provided in the exhaust diffuser 10, and the support members 14 for supporting the turn vanes 13. The support member 14 has a shape that suppresses interference on the fluid flow in the circumferential direction. Specifically, the support member 14 is columnar and the outer edge of its cross section is a curved line. Due to this structure, separation in the flow field having a turn angle can be suppressed, and the loss generated downstream of the support members 14 can be reduced.

With the two-shaft gas turbine in this embodiment, the exhaust diffuser 10 has a shape (lateral exhaust type) that leads the combustion gas to the outer circumferential side of the rotational axis 7, and the support member 14 has a shape that suppresses interference on the fluid flow in an outside direction of the turn vanes 13. Specifically, the support member 14 extends from the inner circumferential casing 21, which is on the inner circumferential side of the flow path in the exhaust diffuser 10, and does not reach the surface of the outer circumferential casing 22, which is on the outer circumferential side of the flow path. In this type of structure, no support member is present at the curved portion on the outer circumferential side, at which separation is likely to occur, so separation of the flow can be suppressed at that portion.

Some of the above effects can also be applied to rotational machines other than two-shaft gas turbines by the same way. That is, if the exhaust diffuser 10 has the turn vanes 13, which redirect the fluid flow, and the support members 14, which support the turn vanes 13, and if the support member 14 has a shape that suppresses the effect of interference on the fluid flow in the circumferential direction of the rotational axis 7, that is, in the direction of the width of the turn vane 13, the loss generated downstream of the support members can be reduced. The direction of the width of the turn vane 13 refers to the direction, on the turn vane 13, perpendicular to the rotational axis 7. In addition, if the exhaust diffuser 10' has a shape that leads the gas to the outer circumferential side of the rotational axis 7, and if the support member 14 has a shape that suppresses interference on the fluid flow in an outside direction of the turn vanes 13, separation of the flow can be suppressed at the curved portion on the outer circumferential side on which there is no support member.

Furthermore, the gas turbine in this embodiment includes the exhaust diffuser 10, which is a flow path of a combustion gas that has driven the low-pressure turbine 5, the exhaust duct 34 for externally expelling the combustion gas, the exhaust chamber 33 for mutually connecting the exhaust diffuser 10 and exhaust duct 34, the turn vanes 13, which are disposed in the exhaust diffuser 10 and redirect a combustion gas flow, the support members 14 for supporting the turn vanes 13. In particular, not only a plant using a one-shaft gas turbine is modified to a plant using a two-shaft gas turbine, but also the axis height is the same before and after the modification. Therefore, the vertical distance from the center of the rotational axis 7 to the top of the exhaust chamber 33 is necessarily longer than the vertical distance from the center of the rotational axis 7 to the bottom of the exhaust chamber 33.

In this type of gas turbine, if the support member 14 is shaped so that interference on the fluid flow in the circumferential direction of the rotational axis 7 is suppressed, generation of a lot of stagnation can be suppressed at the bottom in the vertical direction.

In addition, if the support members 14, which suppress interference on the fluid flow in the exhaust diffuser 10, have different shapes in the circumferential direction, not only fluid loss can be reduced but also strength can be assured.

In summary, the exhaust diffuser 10 in this embodiment not only can improve performance at a rated operation in which there is no turn angle, but also can suppress performance reduction during a part-load operation. In addition, the structure in this embodiment has a few changes from the comparative structure shown in FIG. 5 and is simpler than the technologies in Patent Documents 1 and 2. In terms of cost and ease of modification as well, therefore, this embodiment is superior.

Now, advantages of this embodiment will be considered from the viewpoint of the disassembling performance of the gas turbine. With the gas turbine in this embodiment, in which the support members 14 extend from the inner circumferential casing 21, which is on the inner circumferential side of the flow path in the exhaust diffuser 10, and do not reach the surface of the outer circumferential casing 22, which is on the outer circumferential side of the flow path, a gas turbine superior in ease of disassembling can be further provided. The reason for this will be described below.

To improve maintainability, it is desirable for the casings of the gas turbine to have a horizontal two-piece structure. By contrast, with the gas turbine in the comparative example shown in FIG. 5, the support members 14 are used for connection at the back of the exhaust diffuser 10, making disassembling difficult. Accordingly, the gas turbine in the comparative example includes an outer circumferential-side casing connecting part 72 and an inner circumferential-side casing connecting part 71 so that the exhaust diffuser 10 can be disassembled back and forth. Like this, a back-and-forth two-piece structure is used for the front side. However, these connecting parts are placed at places exposed to an exhaust gas at high temperature, so they may become hard to disassemble due to deterioration.

With the gas turbine in this embodiment, the support members 14 are not fixed to the outer circumferential casing 22. Therefore, a horizontal two-piece structure can be used without having to dispose the outer circumferential-side casing connecting part 72 and inner circumferential-side casing connecting part 71, enabling a highly reliable gas turbine to be provided.

Embodiment 2

Figure 8:
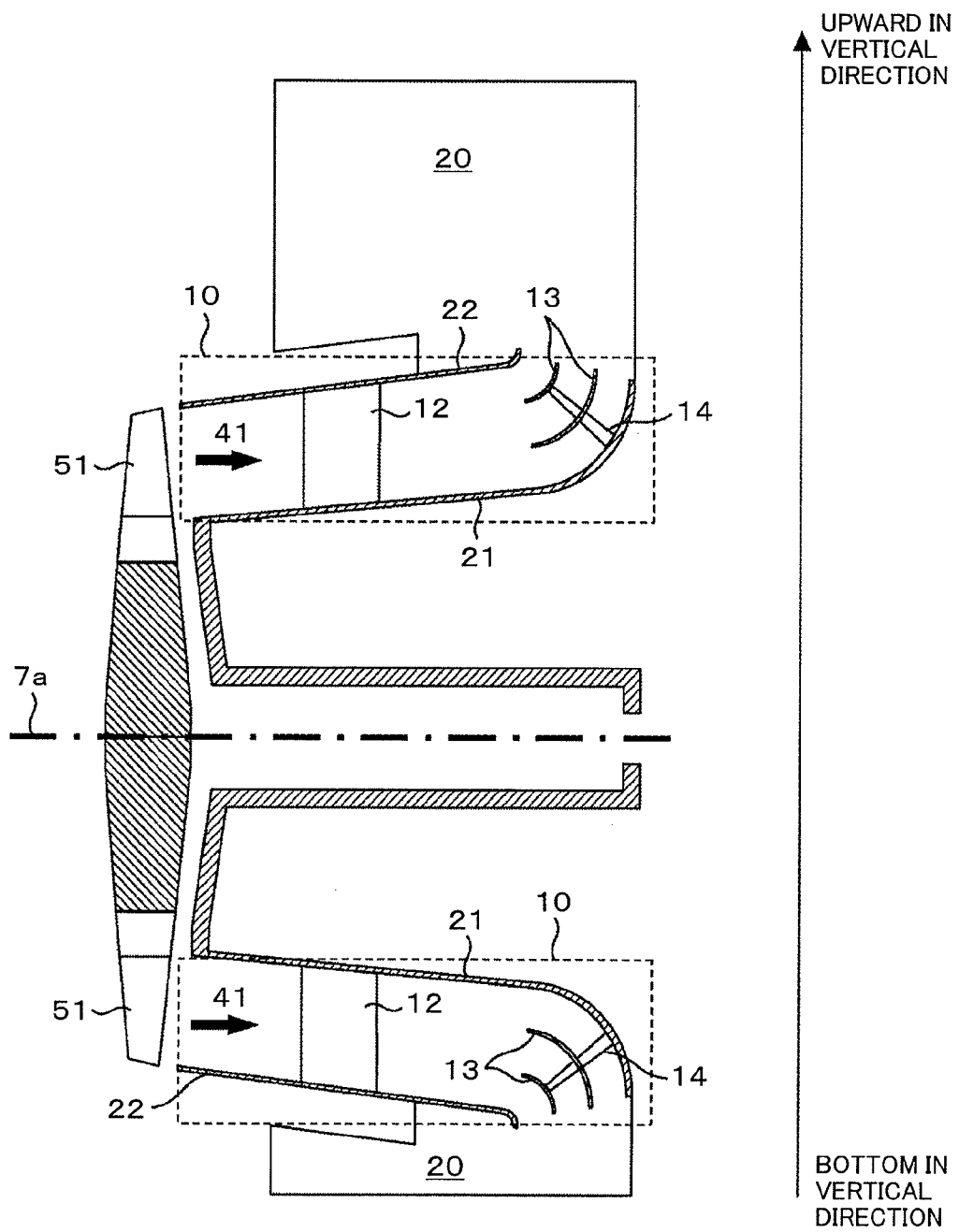
FIG. 8 is a meridional-plane cross sectional view of an exhaust diffuser and exhaust chamber related to a second embodiment of the present invention.

FIG. 8 shows a schematic meridional-plane cross sectional view of the exhaust diffuser and exhaust chamber related to a second embodiment of the present invention. A difference from the first embodiment is that the shape of the support member 14, which support the turn vanes 13 is not columnar but is such that the diameter is reduced from the inner circumference side to the outer circumference side. Incidentally, the same devices as in FIG. 1 are denoted by the same reference numerals and a detailed description will be omitted.

This embodiment assumes a circular truncated cone shape as the shape of the support member 14. However, any shape other than a circular truncated cone shape is not problematic if the shape is such that the diameter of the support member 14 monotonously decreases from the inner circumference side toward the outer circumference side. Since, in FIG. 8, the diameter of the support member 14 changes from the inner circumferential side of the exhaust diffuser toward the outer circumferential side, it is possible to change the diameter at the position at which the support member 14 is connected to the inner circumferential casing 21 and to change the diameter at the position at which the support member 14 is connected to the turn vane 13 on the outermost circumferential side.

The place where the support member 14 undergoes the highest stress is generally the vicinity of the connecting part to the inner circumferential casing 21. Accordingly, the diameter of the support member 14 is determined so that stress at the position where the inner circumferential casing 21 is connected is obtained. However, since the stress exerted on the position at which the support member 14 is connected to the turn vane 13 on the outermost circumferential side is smaller as compared with the inner circumferential side, the diameter of the support member 14 connected to the turn vane 13 on the outermost circumferential side can be made smaller than that connected to the inner circumferential casing 21. The flow passing through the turn vanes 13 on the outermost circumferential side passes through a flow path with a relatively small curvature radius although the curvature radius is not so small as compared with the case of the flow passing through the outer circumferential casing 22. Therefore, it can be said that the smaller the diameter of the support member 14 at the connecting position is, the smaller the possibility of separation, improving performance.

Furthermore, when there is an obstacle to a flow, the resistance is generally increased and the loss is increased as the area in the flow direction is increased. In this embodiment, as described above, the diameter of the support member 14 on the outer circumferential side is smaller than in the first embodiment, so losses other than separation can also be reduced.

With the two-shaft gas turbine in this embodiment, the cross sectional area of the support member 14 on the inner circumferential side is larger than the cross sectional area on the outer circumferential side. In this structure, aerodynamic performance near the turn vane on the outermost circumferential side can be made higher than in the first embodiment while reliability on the inner circumferential side is maintained.

Embodiment 3

Figure 9:
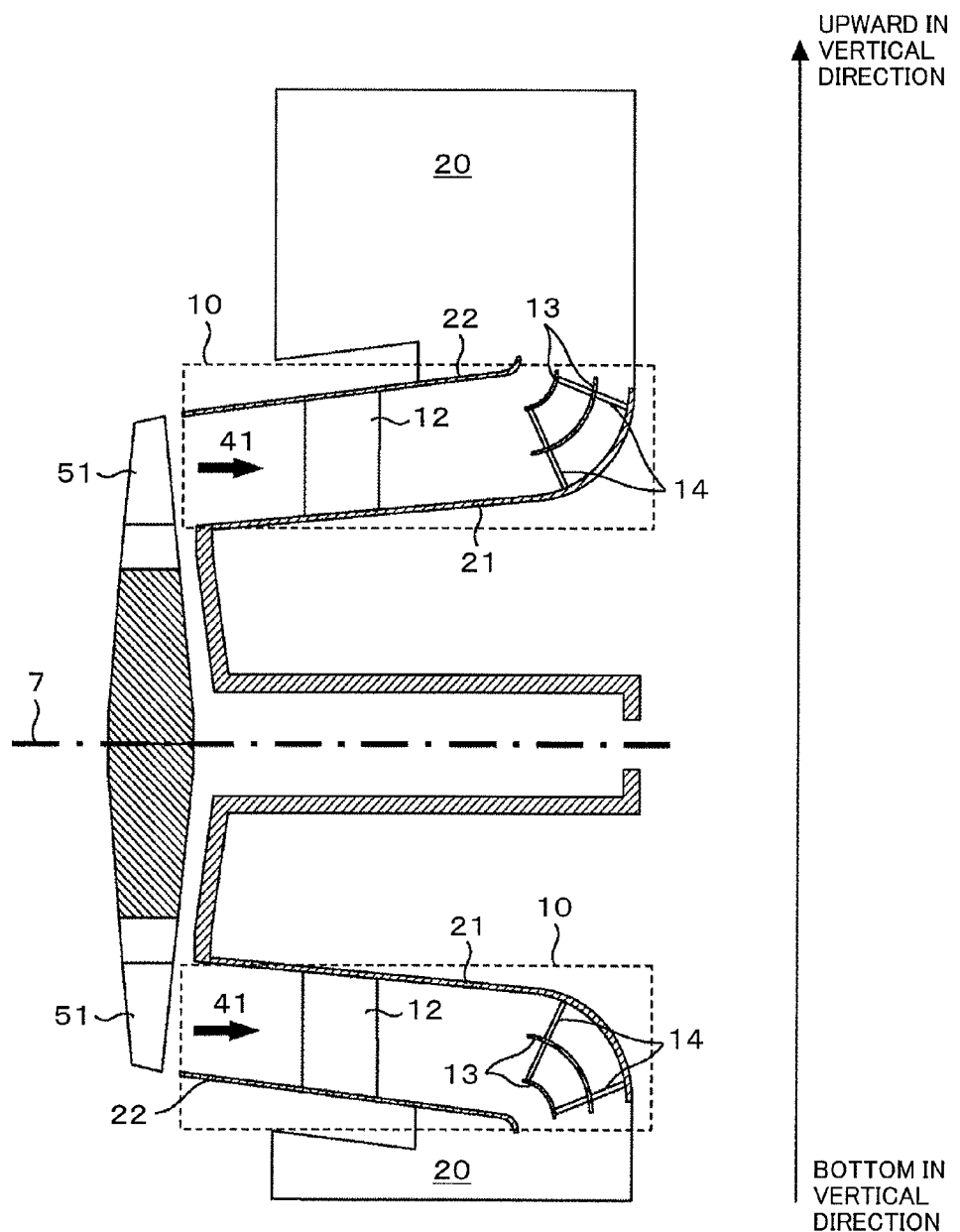
FIG. 9 is a meridional-plane cross sectional view of an exhaust diffuser and exhaust chamber related to a third embodiment of the present invention.

FIG. 9 shows a schematic meridional-plane cross sectional view of the exhaust diffuser and exhaust chamber related to a third embodiment of the present invention. A difference from the first embodiment are that a plurality of support members 14, rather than a single support member, is provided in the direction of the flow, and that their diameter is smaller than when a single support member is provided. Incidentally, the same devices as in FIG. 1 are denoted by the same reference numerals and a detailed description will be omitted.

In FIG. 9, since a plurality of support members 14 is provided in the direction of the flow, stress per support member is reduced, enabling the diameter of the support member 14 to be reduced. Accordingly, as in the embodiment 2, separation at the turn vane 13 on the outermost circumferential side can be suppressed. Incidentally, although an increase in the number of support members results in a new loss, but the loss is smaller than a loss that would be generated when separation occurs. Therefore, the use of a structure as shown in FIG. 9 may improve aerodynamic performance.

In addition, in the present embodiment, since the turn vanes 13 are supported by a plurality of support members with respect to the flow direction, the support members can be disposed near the inlet and outlet of the turn vanes in the flow direction, in comparison with the case of a single support member. Therefore, local stress, which is generated when rotational moment is exerted on the entire turn vane 13, can be reduced, and it can be thought that reliability is also improved.

In FIG. 9, although the number of support members 14 is two, more support members are not problematic. In this case, as the number of support members increases, the diameter per support member can be reduced. In addition, it is also possible to shape the support member 14 in FIG. 9 so that its diameter monotonously decreases from the inner circumference side toward the outer circumference side, as in the embodiment 2. In this case, as in the embodiment 2, it can be thought that a further loss reduction is possible with reliability maintained.

The two-shaft gas turbine in this embodiment has a plurality of support members 14 in the axial direction. This can improve aerodynamic performance, so a highly efficient gas turbine can be obtained.

What is claimed is:

1. A gas turbine which is provided with a compressor for compressing air, a combustor for generating a combustion gas from the air compressed by the compressor and a fuel, a turbine driven by the combustion gas generated by the combustor, an exhaust diffuser which is in a flow path of the combustion gas used to drive the turbine, the flow path being formed of an inner circumferential casing and an outer circumferential casing, an exhaust duct from which the combustion gas is externally expelled, an exhaust chamber in which the exhaust diffuser and the exhaust duct are mutually connected, a turn vane provided in the exhaust diffuser to change a combustion gas flow, a plurality of support members provided in a direction of the combustion gas flow and extending through the turn vane for supporting the turn vane, and a strut to support the outer circumferential casing connecting to the inner circumferential casing, wherein:
a vertical distance from a center of a rotational axis to a top of the exhaust chamber is longer than a vertical distance from the center of the rotational axis to a bottom of the exhaust chamber; and
the support members are shaped with circular cross sections, extend from the inner circumferential casing, and do not reach the surface of the outer circumferential casing so as to suppress interference on a fluid flow in a circumferential direction of the rotational axis.

2. A gas turbine which is provided with a compressor for compressing air, a combustor for generating a combustion gas from the air compressed by the compressor and a fuel, a turbine driven by the combustion gas generated by the combustor,
an exhaust diffuser which is in a flow path of the combustion gas used to drive the turbine, the flow path being formed of an inner circumferential casing and an outer circumferential casing, an exhaust duct from which the combustion gas is externally expelled, an exhaust chamber in which the exhaust diffuser and the exhaust duct are mutually connected, a turn vane provided in the exhaust diffuser to change a combustion gas flow, a plurality of support members provided in a direction of the combustion gas flow and extending through the turn vane for supporting the turn vane, and a strut to support the outer circumferential casing connecting to the inner circumferential casing, wherein:
a vertical distance from a center of a rotational axis to a top of the exhaust chamber is longer than a vertical distance from the center of the rotational axis to a bottom of the exhaust chamber;
the support members are shaped with circular cross sections, extend from the inner circumferential casing, and do not reach the surface of the outer circumferential casing so as to suppress interference on a fluid flow in the exhaust diffuser; and
the support members in the exhaust diffuser differ, in a circumferential direction, in shape, placement, or both shape and placement.

3. An exhaust diffuser which is provided with an inner circumferential casing to form an inner side of a flow path, an outer circumferential casing to form an outer side of the flow path, a strut to support the outer circumferential casing connecting to the inner circumferential casing, a turn vane for redirecting a fluid flow, and a plurality of support members provided in a direction of the combustion gas flow for supporting the turn vane, wherein:
the support members are shaped with circular cross sections, extend from the inner circumferential casing and through the turn vane, and do not reach the surface of the outer circumferential casing so as to suppress interference on the fluid flow in a width direction of the turn vane.

* * * * *